(12) United States Patent
Zhang et al.

(10) Patent No.: US 10,247,751 B2
(45) Date of Patent: Apr. 2, 2019

(54) SYSTEMS, DEVICES, AND METHODS FOR CALCULATING AN INTERNAL LOAD OF A COMPONENT

(71) Applicant: GM Global Technology Operations LLC, Detroit, MI (US)

(72) Inventors: Qijun Zhang, Canton, MI (US); Amy K. Luebke, Northville, MI (US); Susan T. Carruthers, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/626,552

(22) Filed: Jun. 19, 2017

(65) Prior Publication Data

US 2018/0364273 A1    Dec. 20, 2018

(51) Int. Cl.
*G01P 15/03* (2006.01)
*G06T 7/66* (2017.01)
*G06F 17/12* (2006.01)

(52) U.S. Cl.
CPC ............ *G01P 15/032* (2013.01); *G06F 17/12* (2013.01); *G06T 7/66* (2017.01)

(58) Field of Classification Search
CPC .................................................. G01P 15/032
See application file for complete search history.

(56) References Cited

U.S. PATENT DOCUMENTS

| | | | |
|---|---|---|---|
| 2005/0209535 A1* | 9/2005 | Dariush | A61B 5/1038 600/595 |
| 2015/0231786 A1* | 8/2015 | Doi | B25J 9/1605 700/245 |
| 2015/0316579 A1* | 11/2015 | Pakzad | G01P 15/02 702/150 |
| 2017/0113681 A1* | 4/2017 | Kanou | B60W 30/02 |

* cited by examiner

*Primary Examiner* — Chuong D Ngo

(57) ABSTRACT

A system for calculating an internal load of a component includes an acceleration module, a skew matrix module, a center of gravity calculation module, a mass/inertia module, and an internal load module. The acceleration module may obtain a plurality of acceleration measurements associated with a component, where each acceleration measurement is associated with a response point relative to a center of gravity of the component. The skew matrix module may determine a skew matrix based on the response points. The center of gravity calculation module may calculate a center of gravity response for the component based on the plurality of acceleration measurements and the skew matrix. The mass/inertia module may determine a mass/inertia matrix based on measured mass and inertia values associated with the component. The internal load module may calculate an internal load of the component based on the calculated center of gravity response and the mass/inertia matrix.

18 Claims, 9 Drawing Sheets

SYSTEMS, DEVICES, AND METHODS FOR CALCULATING AN INTERNAL LOAD OF A COMPONENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to components having internal loads and, more particularly, to systems and methods for calculating the internal load of a given component.

Knowledge of the internal load of a component (e.g., a component in an automobile) is critical to assessing the performance of the overall system of which the component is a part. Moreover, understanding the internal load of a component ensures optimal design and performance of other, complimentary or cross-functional components. However, frequently, the internal load of a component is unknown. In the automobile context, this may be because the party assembling the automobile did not directly manufacture the constituent components, which may have been provided by third party suppliers, and which may have unknown internal loads.

One conventional technique for measuring the internal load of a component is the Block Force approach. The Block Force approach involves connecting the component at issue to a large mass (e.g., a large block of metal) designed to represent the ground and then measuring the internal load of the component thereafter. However, the Block Force approach suffers from a number of limitations, including: (i) difficulty in measuring forces due to the requirement that the component be fixed to the large mass through a force transducer; (ii) inability to derive the internal load to support component isolation design optimization; and (iii) an assumption that the Block Force measured will be invariant due to the interface condition change.

SUMMARY

Further areas of applicability of the present disclosure will become apparent from the detailed description, the claims and the drawings. The detailed description and specific examples are intended for purposes of illustration only and are not intended to limit the scope of the disclosure.

In a feature, a system is provided. The system may include an acceleration module, a skew matrix module, a center of gravity calculation module, a mass/inertia module, and an internal load module. The acceleration module may be configured to obtain a plurality of acceleration measurements associated with a component. Each acceleration measurement of the plurality of acceleration measurements may be associated with a response point relative to a center of gravity of the component. The skew matrix module may be configured to determine a skew matrix based on the response points associated with the plurality of acceleration measurements. The center of gravity response module may be configured to calculate a center of gravity response for the component based on the plurality of acceleration measurements and the skew matrix. The mass/inertia module may be configured to determine a mass/inertia matrix based on one or more measured mass values associated with the component and one or more measured inertia values associated with the component. The internal load calculation module may be configured to calculate an internal load at the center of gravity of the component based on the calculated center of gravity response and the mass/inertia matrix.

In a feature, the system also includes an isolation system optimization module. The isolation system optimization module may be configured to configure at least one parameter of an attachment system for attachment to the component based on the calculated internal load. In one example of the foregoing feature, the system also includes the attachment system attached to the component. The at least one parameter of the attachment system may be configured based on the internal load.

In one feature, the system also includes a plurality of accelerometers. The plurality of accelerometers may be configured to generate the plurality of acceleration measurements associated with the component.

In another feature, the system also includes an internal force requirement module. The internal force requirement module may be configured to establish one or more internal force requirements associated with the component based on the calculated internal load. In one example of the foregoing feature, the system also includes the component. In this example, the component may be configured to operate within the one or more internal force requirements based on the established one or more internal force requirements.

In yet another feature, the internal load module may be configured to calculate the internal load at the center of gravity of the component by: (i) calculating moment values for three dimensions at the center of gravity of the component; and (ii) calculating force values for three dimensions at the center of gravity of the component. In one example of the foregoing feature, the internal load module may be configured to calculate the moment values for three dimensions at the center of gravity of the component by calculating real and imaginary moment values for three dimensions at the center of gravity of the component. In another example of the foregoing feature, the internal load module may be configured to calculate the force values for three dimensions at the center of gravity of the component by calculating real and imaginary force values for three dimensions at the center of gravity of the component.

In a feature, the acceleration module may be configured to obtain the plurality of acceleration measurements associated with the component by obtaining the plurality of acceleration measurements during operation of the component.

In one feature, the component may include at least one of a pump, an Electro-Hydraulic Control Unit (EHCU), a compressor box, a piston box, and an electronic brake control unit.

In a feature, a method is provided. The method may include obtaining a plurality of acceleration measurements associated with a component. Each acceleration measurement of the plurality of acceleration measurements may be associated with a response point relative to a center of gravity of the component. A skew matrix may be determined based on the response points associated with the plurality of acceleration measurements. A center of gravity response for the component may be calculated based on the plurality of acceleration measurements and the skew matrix. A mass/inertia matrix may be determined based on one or more measured mass values associated with the component and one or more measured inertia values associated with the component. An internal load at the center of gravity of the component may be calculated based on the calculated center of gravity response and the mass/inertia matrix.

In a feature, the method also includes configuring at least one parameter of an attachment system for attachment to the component based on the calculated internal load. In one example of the foregoing feature, the method may also include attaching the attachment system to the component.

In another feature, the method may include establishing one or more internal force requirements associated with the component based on the calculated internal load. In one example of the foregoing feature, the method may also include operating the component within the one or more internal force requirements based on the established one or more internal force requirements.

In one feature, calculating the internal load at the center of gravity of the component may include: (i) calculating moment values for three dimensions at the center of gravity of the component; and/or (ii) calculating force values for three dimensions at the center of gravity of the component. In one example of the foregoing feature, calculating moment values for three dimensions at the center of gravity of the component may include calculating real and imaginary moment values for three dimensions at the center of gravity of the component. In another example of the foregoing feature, calculating force values for three dimensions at the center of gravity of the component may include calculating real and imaginary force values for three dimensions at the center of gravity of the component.

In another feature, obtaining the plurality of acceleration measurements associated with the component may include obtaining the plurality of acceleration measurements during operation of the component.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
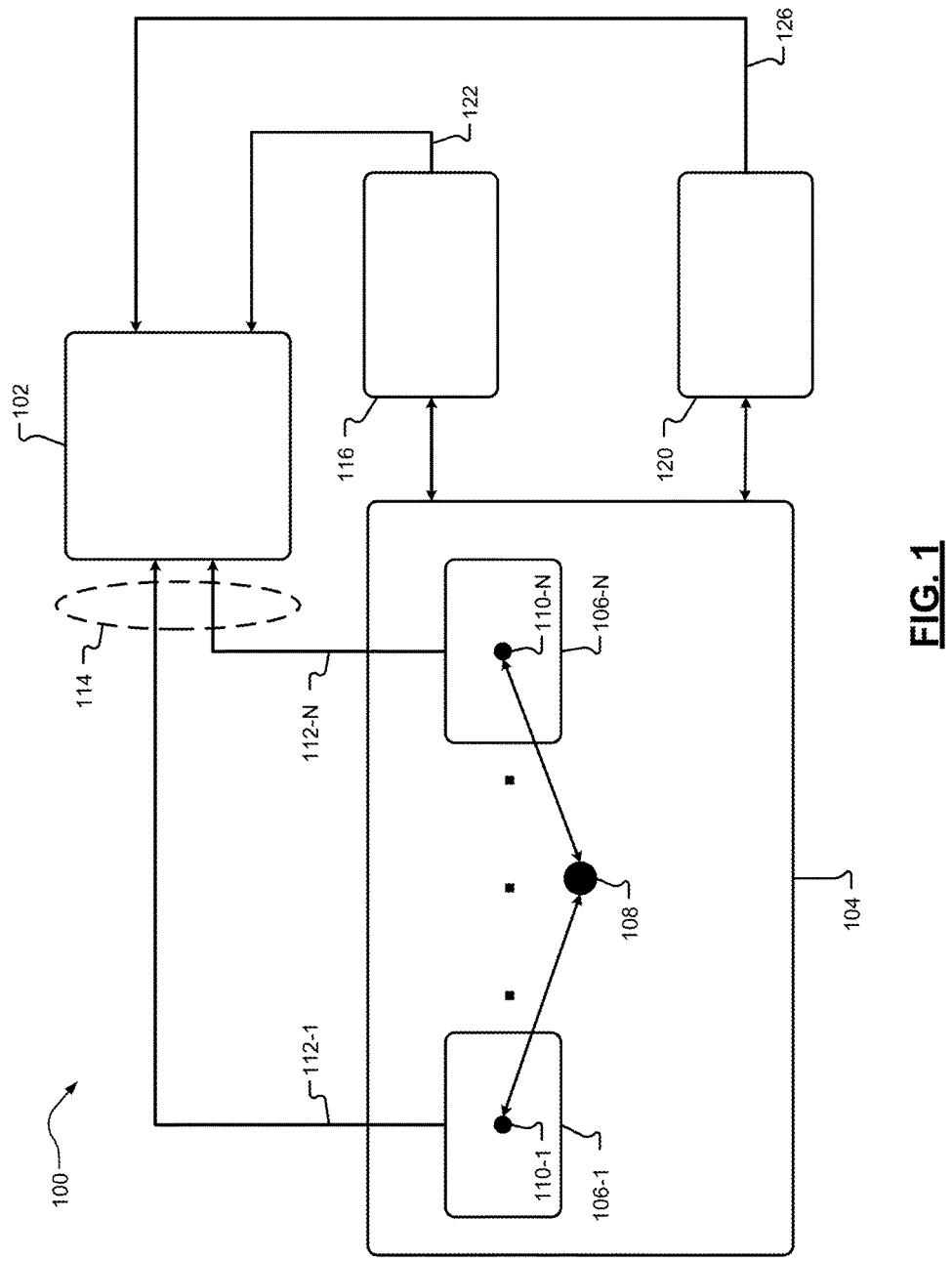
FIG. 1 is a functional block diagram of an example system for calculating the internal load of a component.

Referring now to FIG. 1, an example system 100 for calculating the internal load of a component 104 is shown. The system 100 includes a computing device 102, a component 104 with an internal load sought to be calculated, one or more accelerometers 106-1 through 106-N (where N is an integer greater than one; collectively referred to as accelerometers "106") connected to the component 104, an inertia and mass measuring tool 116, and a response point location measuring tool 120.

The component 104 may constitute any suitable component having an unknown internal load including, but not limited to, a pump, an Electro-Hydraulic Control Unit (EHCU), a compressor box, a piston box, an electronic brake control unit, etc. The inertia and mass measuring tool 116 may constitute any suitable tool for measuring the inertia and mass of the component 104 including, for example, an inertia table. The response point location measuring tool 120 may constitute any suitable distance measuring tool for measuring a response point location associated with an accelerometer (e.g., response point 110-1 associated with accelerometer 106-1) relative to a center of gravity 108 of the component 104 including, but not limited to, one or more laser and/or optical-based distance sensors, a global positioning system, and/or a ruler.

In operation, the computing device 102 is configured to obtain (i.e., fetch or receive) acceleration measurements 114 from the accelerometers 106. For example, the computing device 102 may obtain a first acceleration measurement 112-1 from a first accelerometer 106-1 and another acceleration measurement 112-N from another accelerometer 106-N. The collective acceleration measurements generated by the plurality of accelerometers 106 are denoted by reference numeral 114, and may be expressed mathematically as the measured acceleration response at point i as:

$$\left\{ \begin{array}{c} \ddot{x}_i \\ \ddot{y}_i \\ \ddot{z}_i \end{array} \right\} \tag{1}$$

Each acceleration measurement (e.g., acceleration measurement 112-1) may be associated with a response point (e.g., response point 110-1) relative to a center of gravity 108 of the component 104. Thus, a given response point (e.g., response point 110-1) reflects where a given acceleration measurement (e.g., acceleration measurement 112-1) was obtained relative to the center of gravity 108 of the component 104.

In addition, the computing device 102 is configured to obtain one or more inertia and mass values 122 from the inertia and mass measuring tool 116 and one or more response points 126 from the response point location measuring tool 120. The computing device 102 is configured to determine a skew matrix based on the one or more response points 126 associated with the acceleration measurements 114. In an example, the skew matrix may reflect a given response point's (e.g., response point 110-N's) distance ($\Delta_x$, $\Delta_y$, $\Delta_z$) from the center of gravity 108 of the component in x, y, and z directions (according to a Cartesian coordinate system). In one example, the skew matrix may be given by the following equation for each measuring point:

$$Q_i = \begin{bmatrix} 1 & 0 & 0 & 0 & -\Delta_{zi} & \Delta_{yi} \\ 0 & 1 & 0 & \Delta_{zi} & 0 & -\Delta_{xi} \\ 0 & 0 & 1 & -\Delta_{yi} & \Delta_{xi} & 0 \end{bmatrix} \quad (2)$$

In addition, the computing device 102 is configured to calculate a center of gravity response for the component 104 based on the acceleration measurements 114 and the skew matrix. In one example, the center of gravity response may be given by the following equation:

$$\{\ddot{x}_{CG}\} = [Q]^{-1} \begin{Bmatrix} \ddot{x}_i \\ \ddot{y}_i \\ \ddot{z}_i \end{Bmatrix} \quad (3)$$

Furthermore, the computing device 102 may be configured to determine a mass/inertia matrix [M] based on one or more measured mass and inertia values 122 associated with the component 104. In one example, the mass/inertia matrix may include a 6×6 matrix of mass/inertia values.

Relying on the calculated center of gravity response and mass/inertia matrix, the computing device 102 is configured to calculate an internal load for the component. The calculated internal load reflects the internal load of the component 104 at its center of gravity 108 and may be expressed by the following equation:

$$\{F_{CG}\} = [M]\{\ddot{x}_{CG}\} \quad (4)$$

Figure 6:
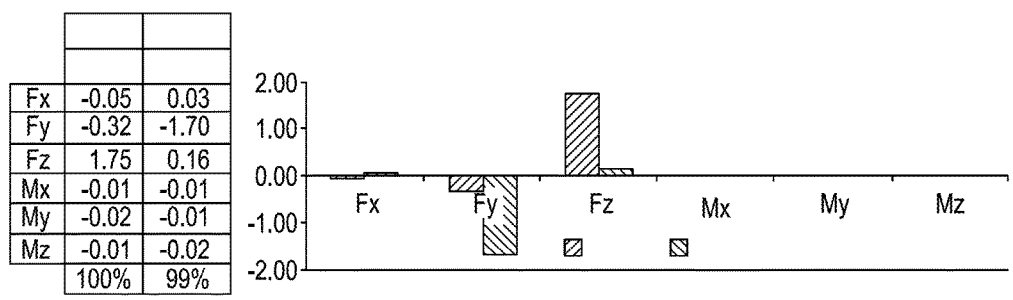
FIG. 6 is a chart and corresponding bar graph illustrating a calculated internal load of the Pump of FIG. 4 according to aspects of the present disclosure.
Figure 9:
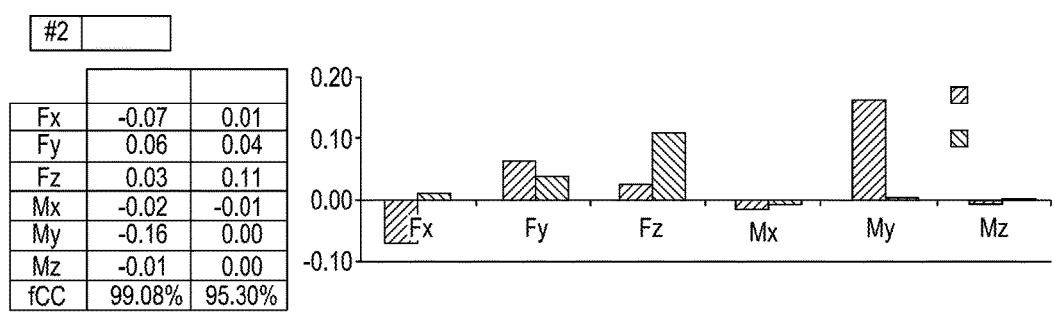
FIG. 9 is a chart and corresponding bar graph illustrating a calculated internal load of the EHCU of FIG. 7 according to aspects of the present disclosure.

In one example, the computing device 102 is configured to calculate the internal load at the center of gravity 108 of the component 104 by calculating moment values for three dimensions at the center of gravity of the component and calculating force values for three dimensions at the center of gravity 108 of the component, as shown in FIGS. 6 and 9 and discussed in greater detail below.

Figure 2:
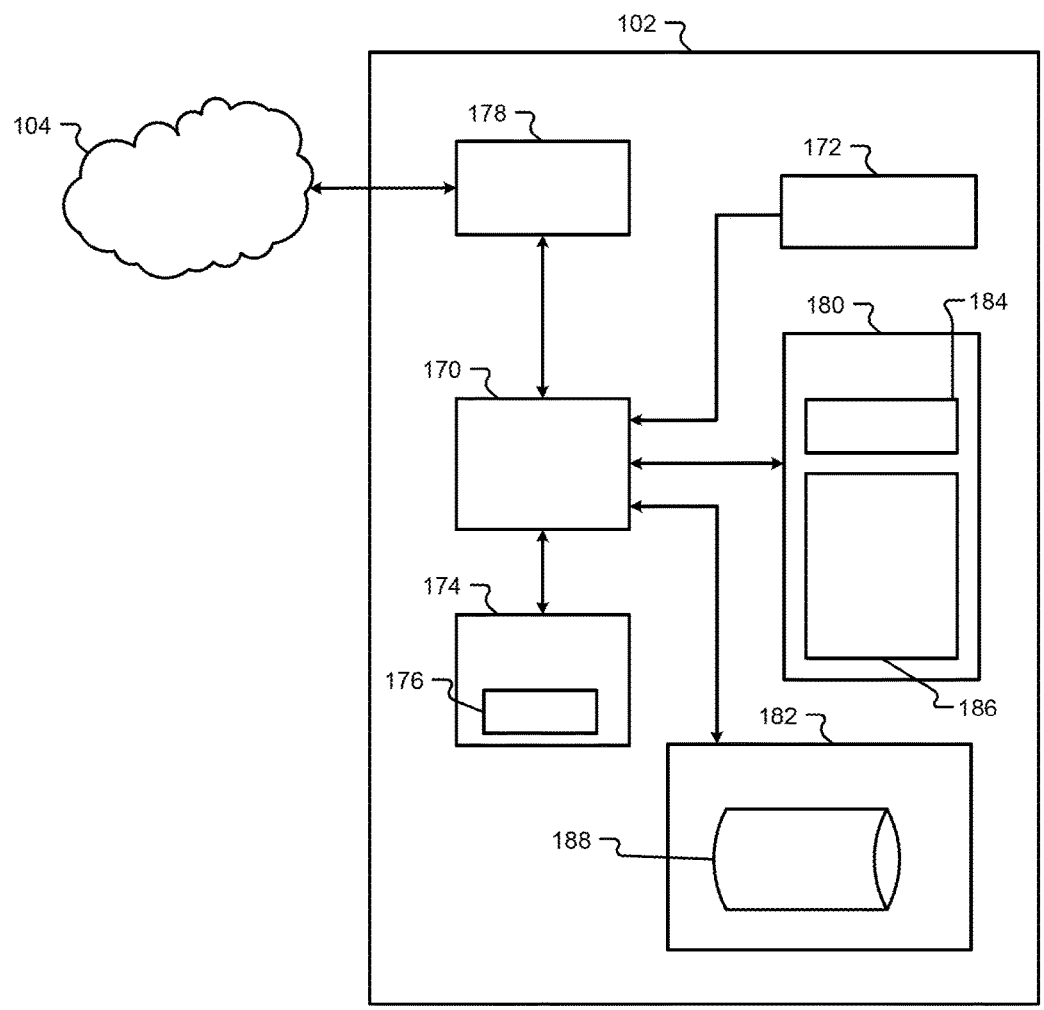
FIG. 2 is a functional block diagram of an example computing device for calculating the internal load of a component.

Turning now to FIG. 2, one example of the computing device 102 for calculating an internal load of a component is shown. The computing device 102 includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the computing device 102 to ancillary components including, for example, accelerometers (e.g., the accelerometers 106), measuring tools (e.g., the inertia measuring tool 116, the mass measuring tool 118, and/or the response point measuring tool 120), etc. via the network 104. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the computing device 102 executes an operating system (OS) 184 and an internal load calculation application 186 configured to calculate an internal load of a component as discussed in additional detail below. The bulk storage 182 may store one or more databases 188 that store data structures used by the internal load calculation application 186 to perform respective functions.

Figure 3:
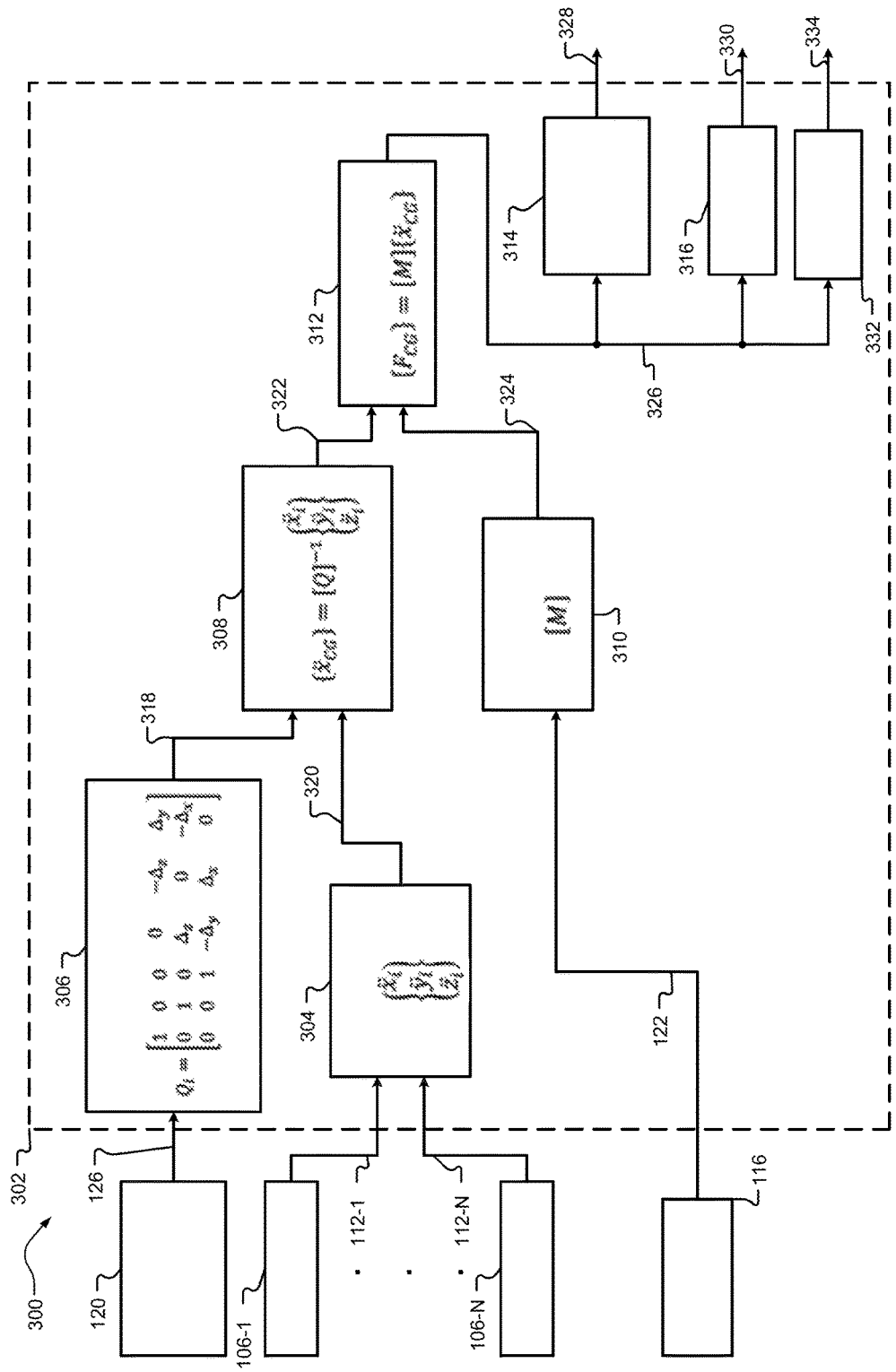
FIG. 3 is a functional block diagram of an example system for calculating the internal load of a component.

Referring now to FIG. 3, another example system 300 for calculating the internal load of a component is shown. The system 300 includes a computing device 302. In certain examples, the computing device 302 may be implemented in accordance with the computing device 102 discussed above with regard to FIGS. 1 and 2. The computing device 302 of system 300 may be communicatively connected to a response point measuring tool 120, one or more accelerometers 106-1 through 106-N, and an inertia/mass measuring tool 116.

The computing device 302 includes an acceleration module 304, a skew matrix module 306, a center of gravity response module 308, a mass/inertia module 310, an internal load module 312, an isolation system optimization module 314, an internal force requirement module 316, and a display data module 322.

In operation, the acceleration module 304 is configured to obtain acceleration measurements 112-1 through 112-N associated with a component (e.g., component 104 shown in FIG. 1). In one example, the acceleration measurements may be obtained during operation of the component. Each acceleration measurement may be associated with a response point relative to a center of gravity of the component, and the collective acceleration measurements 320 may, again, be expressed as:

$$\begin{Bmatrix} \ddot{x}_i \\ \ddot{y}_i \\ \ddot{z}_i \end{Bmatrix} \quad (5)$$

The skew matrix module 306 is configured to determine a skew matrix $Q_i$ 318 based on the response points 126 associated with the acceleration measurements 112-1 through 112-N, which, again, may be expressed as:

$$Q_i = Q_i = \begin{bmatrix} 1 & 0 & 0 & 0 & -\Delta_{zi} & \Delta_{yi} \\ 0 & 1 & 0 & \Delta_{zi} & 0 & -\Delta_{xi} \\ 0 & 0 & 1 & -\Delta_{yi} & \Delta_{xi} & 0 \end{bmatrix} \quad (6)$$

The center of gravity response module 308 is configured to calculate a center of gravity response $\{\ddot{x}_{CG}\}$ 322 for the component based on the acceleration measurements 320 and the skew matrix 318, again, according to the following equation:

$$\{\ddot{x}_{CG}\} = [Q]^{-1} \begin{Bmatrix} \ddot{x}_i \\ \ddot{y}_i \\ \ddot{z}_i \end{Bmatrix} \quad (7)$$

The mass/inertia module 310 is configured to determine a mass/inertia matrix [M] 324 based on one or more measured mass/inertia values 122 associated with the component. In one example, the mass/inertia matrix [M] 324 may include a 6×6 matrix of mass/inertia values.

The internal load module 312 is configured to calculate an internal load $\{F_{CG}\}$ 326 at the center of gravity of the component based on the calculated center of gravity response $\{\ddot{x}_{CG}\}$ 322 and the mass/inertia matrix [M] 324, again, according to the following equation:

$$\{F_{CG}\} = [M]\{\ddot{x}_{CG}\} \quad (8)$$

The isolation system optimization module 314 is configured to configure at least one parameter of an attachment system for attachment to the component based on the calculated internal load 326. The configured parameter 328 may define characteristics of an attachment system designed for attachment to the component. For example, the configured parameter 328 may define a type, shape, weight, size, or material composition of an attachment system for attachment to the component.

Those having ordinary skill will recognize that the foregoing list is merely exemplary in nature and the configured parameter 328 may define other characteristics of an attachment system without deviating from the teachings herein. In some examples, the attachment system may serve as an interface between the component and the other components included as part of a larger system. For example, in an implementation where the component is a pump included as part of an automobile, the attachment system may include a bracket or the like designed to secure the pump within the automobile in a manner that limits the amount of noise and/or vibration induced by the pump during operation.

The internal force requirement module 322 is configured to establish one or more internal force requirements 330 associated with the component based on the calculated internal load 326. The established internal force requirement(s) 330 may be used, for example, to set "not to exceed" thresholds regarding the amount of internal force is possible during operation of the component. In some examples, the internal force requirement(s) 330 may be utilized to control current driving a motor or the like.

The display data module 332 is configured to generate display data 334 representative of the acceleration measurements 320 and/or calculated internal load 326. Such display data 334 may include pixel values or the like for rendering an image on a suitable display device (e.g., a LCD screen). FIGS. 5-6 and 8-9, discussed below, illustrate certain examples of display data 334 that may be generated by the display data module of the computing device 302.

Figure 4:
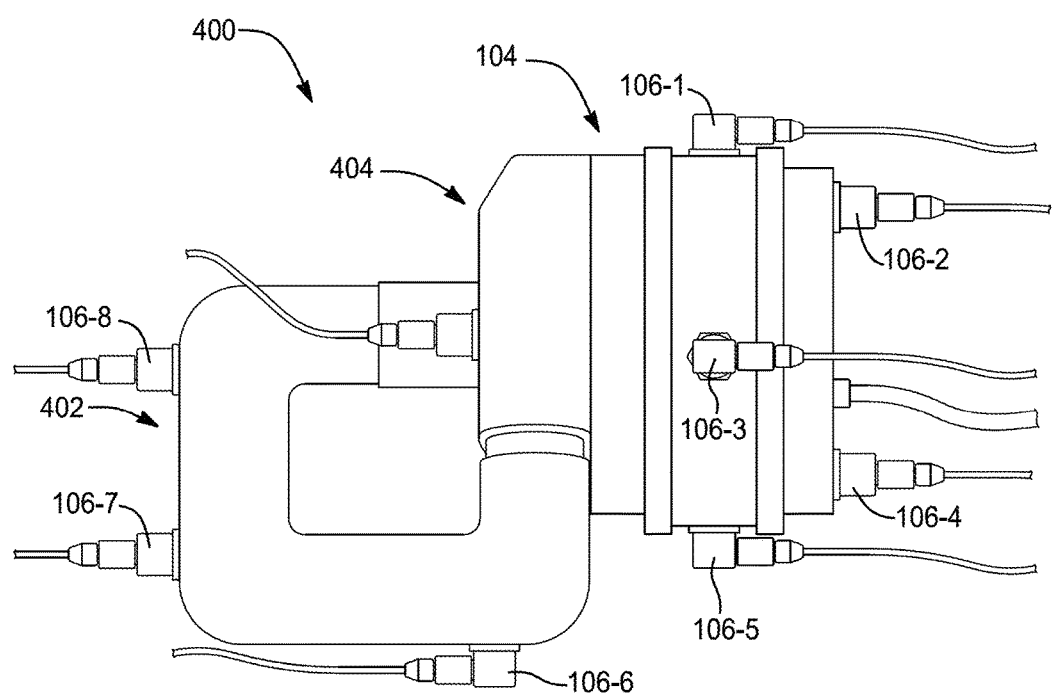
FIG. 4 is an image of an example pump having an internal load that may be calculated according to aspects of the present disclosure.

FIG. 4 illustrates an example of a portion of a system 400 for calculating the internal load of a component in accordance with the present disclosure. More specifically, FIG. 4 illustrates an example component in the form of a pump 104. The pump 104 is connected to a pipe 402 and an attachment system 404 (shown behind the pipe in FIG. 4). A plurality of accelerometers 106-1 through 106-8 are disposed about the pump 104 and pipe 402 to generate acceleration measurements that may be processed by a computing device in accordance with the foregoing discussion to, among other things, calculate an internal load of the pump 104. In one example, the pump may be configured into an operable state such that a fluid is pumped through the pipe 402. While shown external to the pump 104 and pip 402, in certain implementations, the accelerometers 106-1 through 106-8 may be disposed within the component under consideration (e.g., pump) and/or any attaching components without deviating from the teachings herein. During operation of the pump 104, the accelerometers 106-1 through 106-8 may generate acceleration measurements that may be used to calculate an internal load for the pump 104.

Figure 5:
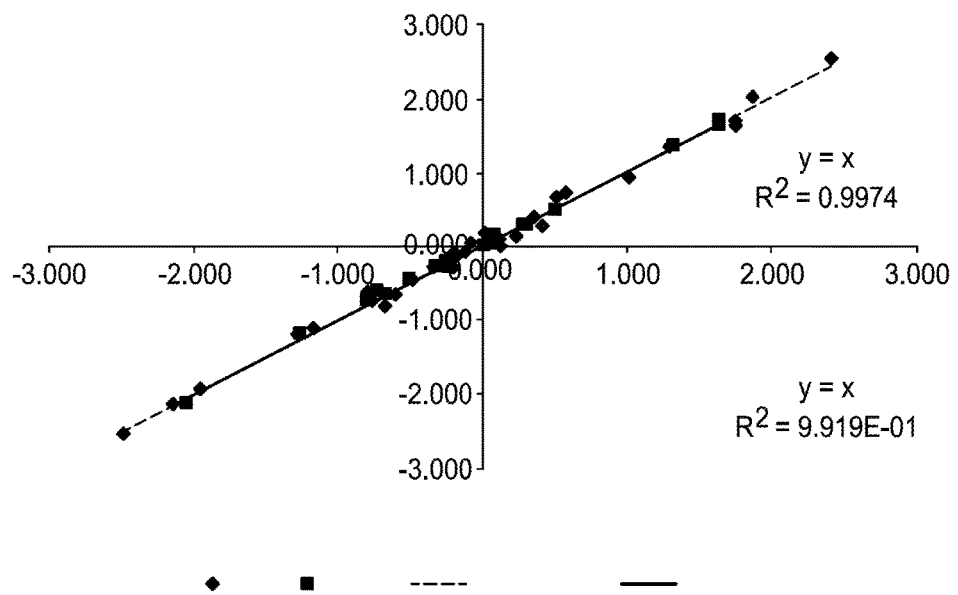
FIG. 5 is a graph illustrating example acceleration measurements associated with the Pump of FIG. 4 according to aspects of the present disclosure.

FIG. 5 illustrates display data in the form of a graph representing example acceleration measurements generated by the accelerometers 106-1 through 106-8 disposed about the pump 104 and pipe 402 of FIG. 4. The square points on the graph represent acceleration measurements from accelerometers disposed solely on the pump 104, while the diamond-shaped points on the graph represent acceleration measurements from accelerometers disposed on both the pump 104 and the pipe 402.

FIG. 6 illustrates display data in the form of a table and corresponding bar graph representing an example calculated internal load for the pump of FIG. 4. The internal load of the pump is described in terms of moment values for three dimensions (x, y, and z) at the center of gravity of the pump 104. More specifically, the moment values are expressed in both real and imaginary terms for three dimensions at the center of gravity of the pump 104. Additionally, the internal load of the pump 104 is described in terms of force values for three dimensions at the center of gravity of the pump 104. As with the moment values, the force values are expressed in both real and imaginary terms for three dimensions at the center of gravity of the pump 104.

Figure 7:
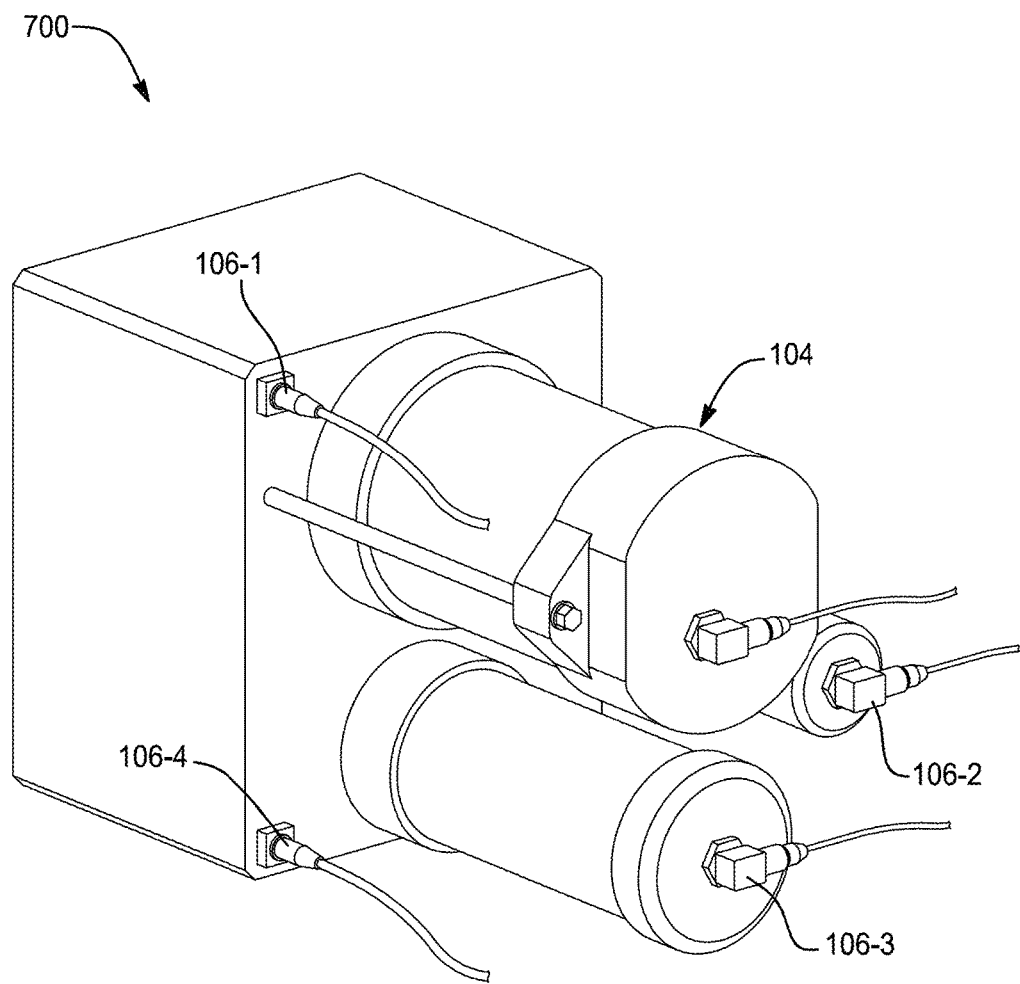
FIG. 7 is an image of an example Electro-Hydraulic Control Unit (EHCU) having an internal load that may be calculated according to aspects of the present disclosure.

FIG. 7 illustrates an example of a portion of a system 700 for calculating the internal load of a component in accordance with the present disclosure. More specifically, FIG. 7 illustrates an example component in the form of an EHCU 104. A plurality of accelerometers 106-1 through 106-4 are disposed about the EHCU 104 to generate acceleration measurements that may be processed by a computing device in accordance with the foregoing discussion to, among other things, calculate an internal load of the EHCU 104. In one example, the EHCU may be configured into an operable state. During operation of the EHCU 104, the accelerometers 106-1 through 106-4 may generate acceleration measurements that may be used to calculate an internal load for the EHCU 104.

Figure 8:
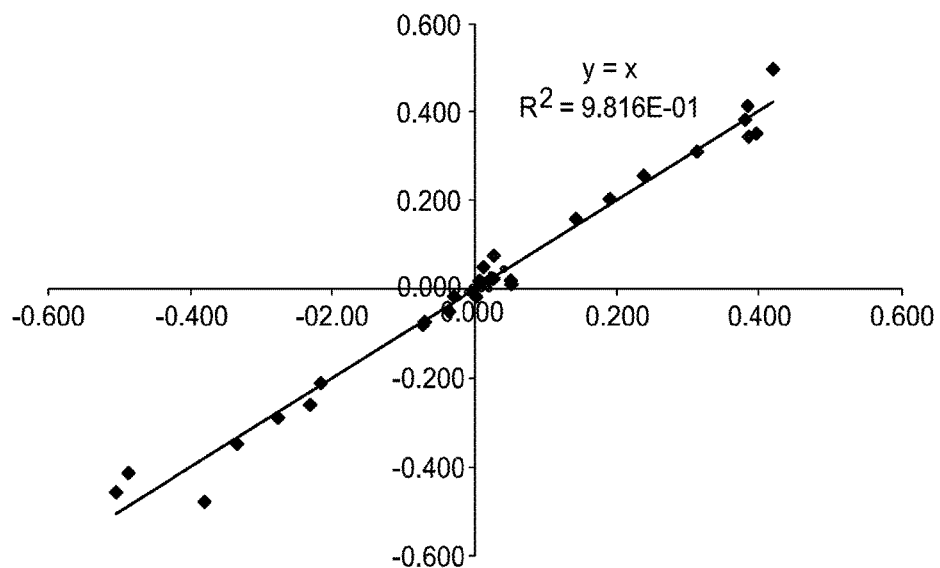
FIG. 8 is a graph illustrating example acceleration measurements associated with the EHCU of FIG. 7 according to aspects of the present disclosure.

FIG. 8 illustrates display data in the form of a graph representing example acceleration measurements generated by the accelerometers 106-1 through 106-4 disposed about the EHCU 104 of FIG. 7.

FIG. 9 illustrates display data in the form of a table and corresponding bar graph representing an example calculated internal load for the EHCU of FIG. 7. The internal load of the EHCU is described in terms of moment values for three dimensions (x, y, and z) at the center of gravity of the EHCU 104. More specifically, the moment values are expressed in both real and imaginary terms for three dimensions at the center of gravity of the EHCU 104. Additionally, the internal load of the EHCU 104 is described in terms of force values for three dimensions at the center of gravity of the EHCU 104. As with the moment values, the force values are expressed in both real and imaginary terms for three dimensions at the center of gravity of the EHCU 104.

Figure 10:
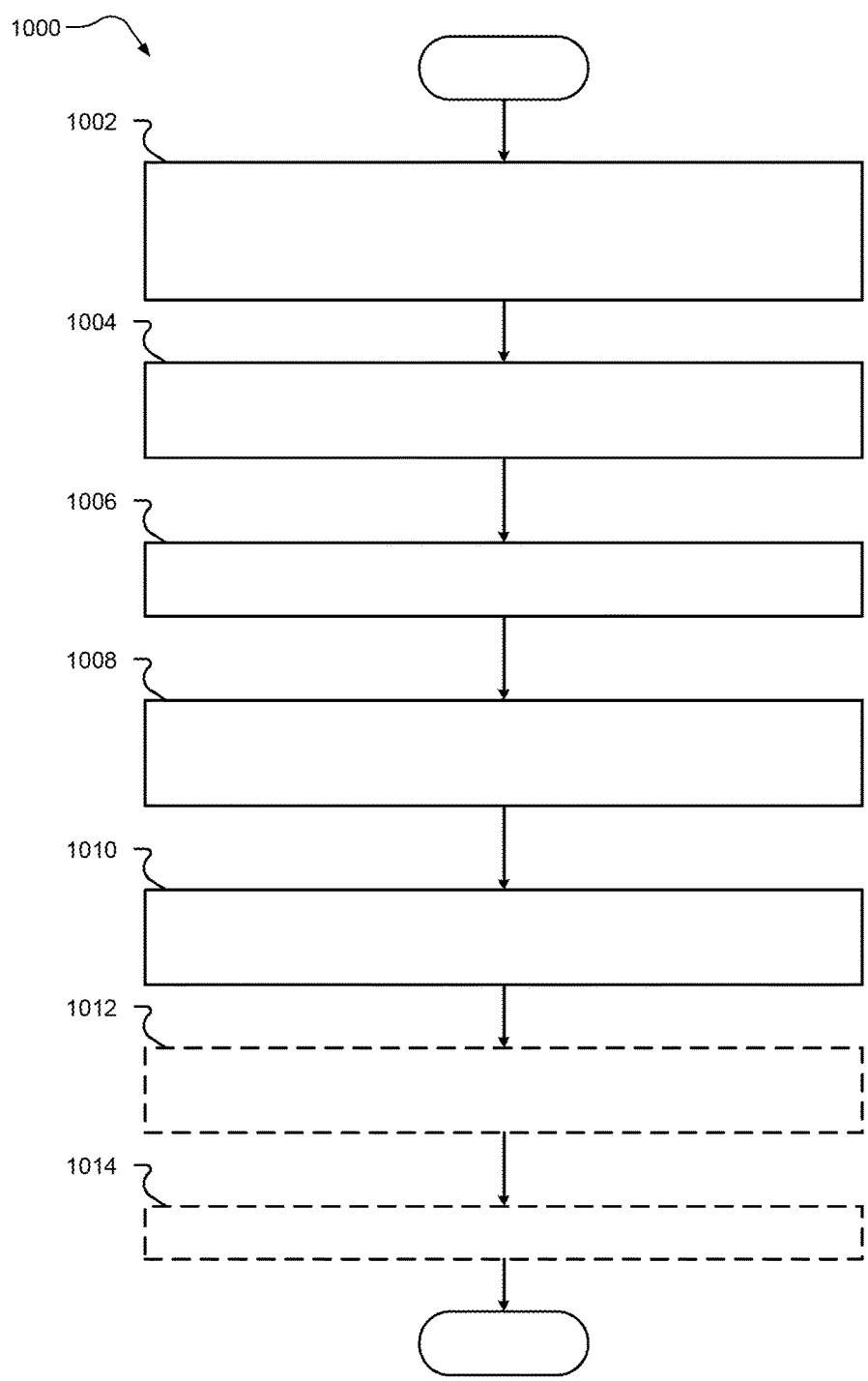
FIG. 10 is a flowchart illustrating an example method for calculating an internal load of a component.

Referring now to FIG. 10, a flowchart illustrating an example method 1000 for calculating an internal load of a component is provided. The method 1000 begins at 1002 where a plurality of acceleration measurements associated with a component are obtained. Each acceleration measurement of the plurality of acceleration measurements may be associated with a response point relative to a center of gravity of the component. At 1004, a skew matrix is determined based on the response points associated with the plurality of acceleration measurements. At 1006, a center of gravity response for the component is calculated based on the plurality of acceleration measurements and the skew matrix. At 1008, a mass/inertia matrix is determined based on one or more measured mass and inertia values associated with the component. At 1010, an internal load at the center of gravity of the component is calculated based on the calculated center of gravity response and the mass/inertia matrix. In some examples, the method 1000 may conclude following step 1010. However, in other examples, the method 1000 may continue to 1012 where at least one parameter of an attachment system for attachment to the component is configured based on the calculated internal load. At 1014, according to some examples, the attachment system is connected to the component before the method 1000 concludes.

Figure 11:
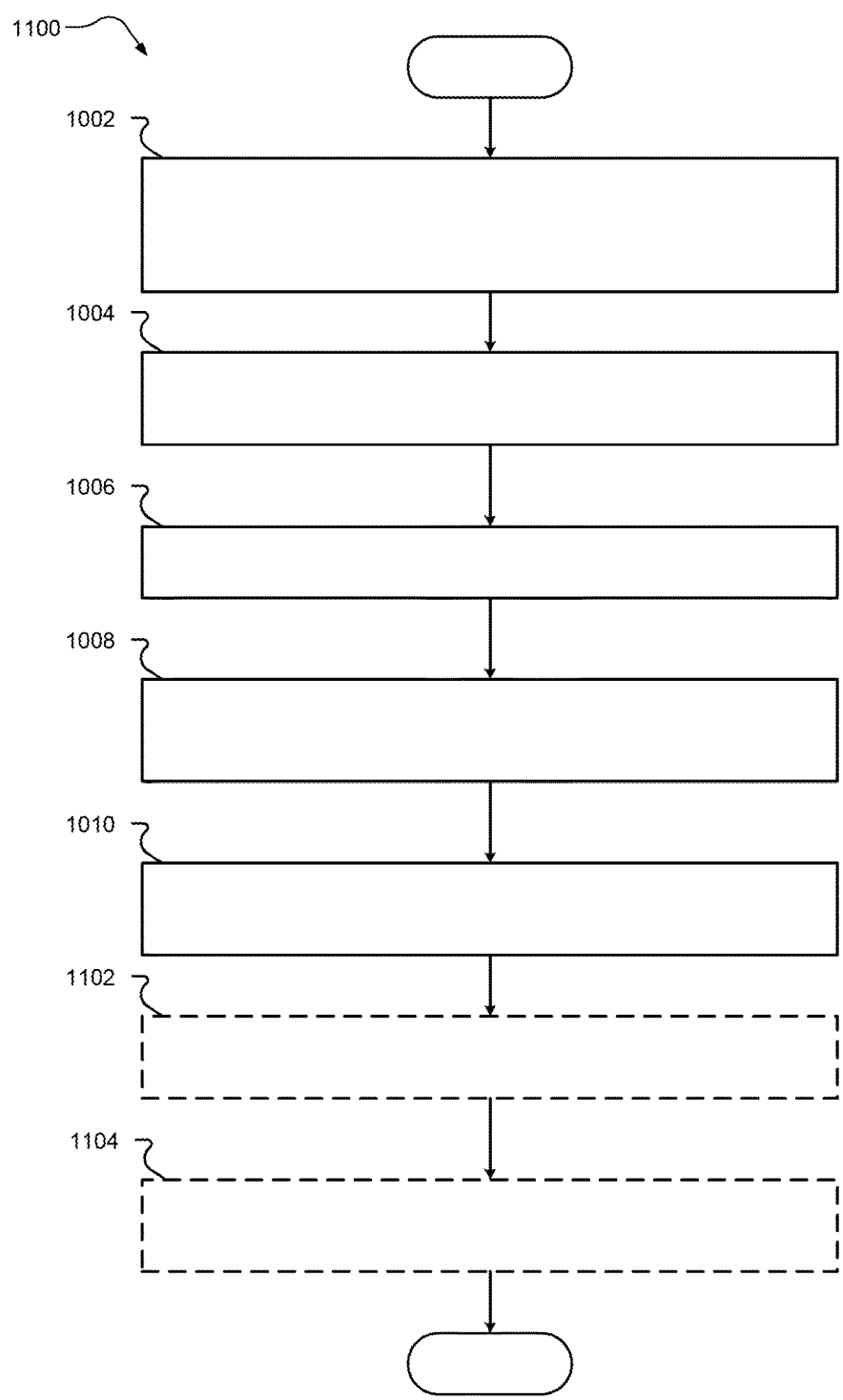
FIG. 11 is a flowchart illustrating another example method for calculating an internal load of a component.

Referring now to FIG. 11, a flowchart illustrating another example method 1100 for calculating an internal load of a component is provided. Steps 1002-101 are carried out in accordance with the discussion of those steps set forth above with regard to FIG. 10. However, according to method 110, additional steps 1102 and 1104 are carried out before the method 1100 concludes. Specifically, at 1102, one or more internal force requirements associated with the component are established based on the calculated internal load. At 1104, the component is operated within the one or more internal force requirements based on the established one or more internal force requirements before the method 1100 concludes.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising
an acceleration module configured to:
obtain an acceleration measurement associated with a component, wherein the acceleration measurement is associated with a response point relative to a center of gravity of the component;
a skew matrix module configured to:
determine a skew matrix based on the response point associated with the acceleration measurement;
a center of gravity response module configured to:
calculate a center of gravity response for the component based on the acceleration measurement and the skew matrix;
a mass/inertia module configured to:
determine a mass/inertia matrix based on a measured mass value associated with the component and a measured inertia value associated with the component; and
an internal load module configured to:
calculate an internal load at the center of gravity of the component based on the calculated center of gravity response and the mass/inertia matrix; and
an isolation system optimization module configured to:
configure at least one parameter of an attachment system for attachment to the component based on the calculated internal load.

2. The system of claim 1, further comprising:
the attachment system attached to the component,
wherein at least one parameter of the attachment system is configured based on the calculated internal load.

3. The system of claim 1, further comprising a plurality of accelerometers configured to:
generate the acceleration measurement associated with the component.

4. The system of claim 1, further comprising an internal force requirement module configured to:
establish an internal force requirement associated with the component based on the calculated internal load.

5. The system of claim 4, further comprising:
the component,
wherein the component is configured to operate within the internal force requirement based on the established internal force requirement.

6. The system of claim 1, wherein the internal load module is configured to calculate the internal load at the center of gravity of the component by:
calculating a moment value for three dimensions at the center of gravity of the component; and
calculating a force value for three dimensions at the center of gravity of the component.

7. The system of claim 6, wherein the internal load module is configured to calculate the moment value for three dimensions at the center of gravity of the component by calculating a real and an imaginary moment value for three dimensions at the center of gravity of the component.

8. The system of claim 6, wherein the internal load module is configured to calculate the force value for three dimensions at the center of gravity of the component by calculating a real and an imaginary force value for three dimensions at the center of gravity of the component.

9. The system of claim 1, wherein the acceleration module is configured to obtain the acceleration measurement associated with the component by:
obtaining the acceleration measurement during operation of the component.

10. The system of claim 1, wherein the component comprises at least one of a pump, an Electro-Hydraulic Control Unit (ENCU), a compressor box, a piston box, and an electronic brake control unit.

11. A method comprising:
obtaining, via a processor, an acceleration measurement associated with a component, wherein the acceleration measurement is associated with a response point relative to a center of gravity of the component;
determining, via the processor, a skew matrix based on the response point associated with the acceleration measurement;
calculating, via the processor, a center of gravity response for the component based on the acceleration measurement and the skew matrix;
determining, via the processor, a mass/inertia matrix based on a measured mass value associated with the component and a measured inertia value associated with the component;
calculating, via the processor, an internal load at the center of gravity of the component based on the calculated center of gravity response and the mass/inertia matrix; and
configuring, via the processor, at least one parameter of an attachment system for attachment to the component based on the calculated internal load.

12. The method of claim 11, further comprising:
attaching the attachment system to the component.

13. The method of claim 11, further comprising:
establishing an internal force requirement associated with the component based on the calculated internal load.

14. The method of claim 13, further comprising:
operating the component within the internal force requirement based on the established internal force requirement.

15. The method of claim 11, wherein calculating the internal load at the center of gravity of the component comprises:
calculating a moment value for three dimensions at the center of gravity of the component; and calculating a force value for three dimensions at the center of gravity of the component.

16. The method of claim 15, wherein calculating moment values for three dimensions at the center of gravity of the component comprises calculating a real and an imaginary moment value for three dimensions at the center of gravity of the component.

17. The method of claim 15, wherein calculating a force value for three dimensions at the center of gravity of the component comprises calculating a real and an imaginary force value for three dimensions at the center of gravity of the component.

18. The method of claim 11, wherein obtaining the acceleration measurement associated with the component comprises obtaining the acceleration measurement during operation of the component.

* * * * *